United States Patent
Ricaud et al.

(10) Patent No.: US 8,366,041 B2
(45) Date of Patent: Feb. 5, 2013

(54) AIRCRAFT FLOOR, USE OF SAID FLOOR AND AIRCRAFT SECTION FITTED WITH SAID FLOOR

(75) Inventors: Alexandre Ricaud, Pointis de Riviere (FR); Bernard Rolland, Fonsorbes (FR)

(73) Assignee: Airbus Operations SAS, Toulouse (FR)

( * ) Notice: Subject to any disclaimer, the term of this patent is extended or adjusted under 35 U.S.C. 154(b) by 558 days.

(21) Appl. No.: 12/297,604

(22) PCT Filed: Apr. 6, 2007

(86) PCT No.: PCT/EP2007/053419
§ 371 (c)(1),
(2), (4) Date: Mar. 9, 2009

(87) PCT Pub. No.: WO2007/122096
PCT Pub. Date: Nov. 1, 2007

(65) Prior Publication Data
US 2009/0294587 A1 Dec. 3, 2009

(30) Foreign Application Priority Data

Apr. 20, 2006 (FR) .................................... 06 51386

(51) Int. Cl.
*B64C 1/00* (2006.01)
*B64C 1/18* (2006.01)
(52) U.S. Cl. .................. 244/119; 244/117 R; 244/129.1
(58) Field of Classification Search ............... 244/118.1, 244/118.5, 119, 117 R, 120, 102 R, 100 R, 244/129.1, 129.5
See application file for complete search history.

(56) References Cited

U.S. PATENT DOCUMENTS

| | | | | |
|---|---|---|---|---|
| 2,416,245 A * | 2/1947 | Watter et al. | .................. | 244/119 |
| 4,479,621 A * | 10/1984 | Bergholz | .................. | 244/117 R |
| 5,000,400 A * | 3/1991 | Stuhr | ........................ | 244/102 R |
| 5,542,626 A * | 8/1996 | Beuck et al. | .................. | 244/107 |
| 6,273,364 B1 * | 8/2001 | Tizac et al. | ............... | 244/100 R |
| 6,554,225 B1 * | 4/2003 | Anast et al. | ............... | 244/117 R |
| 6,834,833 B2 * | 12/2004 | Sankrithi | ...................... | 244/119 |
| 7,163,178 B2 * | 1/2007 | Ricaud | ........................ | 244/118.1 |
| 7,407,134 B2 * | 8/2008 | Bietenhader | ............... | 244/102 A |
| 7,775,478 B2 * | 8/2010 | Wood et al. | .................. | 244/119 |
| 8,016,234 B2 * | 9/2011 | Muller et al. | ................. | 244/119 |
| 8,025,253 B2 * | 9/2011 | Sprenger | ...................... | 244/121 |
| 8,256,711 B2 * | 9/2012 | Guering et al. | ........... | 244/102 R |
| 2009/0230241 A1 * | 9/2009 | Heller et al. | ............... | 244/118.1 |

(Continued)

FOREIGN PATENT DOCUMENTS

| DE | 10 60 264 | 6/1959 |
|---|---|---|
| DE | 31 41 869 | 5/1983 |

(Continued)

*Primary Examiner* — Joshua J Michener
*Assistant Examiner* — Elizabeth A Plummer
(74) *Attorney, Agent, or Firm* — Patterson Thuente Christensen Pedersen, P.A.

(57) ABSTRACT

An aircraft floor, and aircraft section provided with such a floor, and the utilization of such a floor in an aircraft section. The aircraft floor generally includes at least one central rail firmly mounted on a rigid structure of the aircraft, at least two lateral rails positioned on both sides of the central rail, and floor panels. Each lateral rail is connected vertically to the structure of the aircraft through a vertical connecting rod, each lateral rail being transversely free. Each floor panel is positioned between two adjacent rails, so that the transverse forces to which the lateral rails are subjected pass through the floor panels to the central rail.

5 Claims, 4 Drawing Sheets

U.S. PATENT DOCUMENTS

| | | | |
|---|---|---|---|
| 2009/0236472 A1* | 9/2009 | Wood | 244/119 |
| 2009/0302157 A1* | 12/2009 | Ricaud | 244/118.6 |
| 2010/0001129 A1* | 1/2010 | Guering | 244/102 R |
| 2010/0012773 A1* | 1/2010 | Im | 244/36 |
| 2010/0108808 A1* | 5/2010 | Allain et al. | 244/118.6 |
| 2010/0116932 A1* | 5/2010 | Helou, Jr. | 244/118.1 |
| 2010/0163669 A1* | 7/2010 | Im | 244/36 |
| 2010/0187352 A1* | 7/2010 | Yavilevich | 244/36 |
| 2011/0001006 A1* | 1/2011 | Delahaye et al. | 244/118.5 |
| 2011/0001008 A1* | 1/2011 | Delahaye et al. | 244/119 |
| 2012/0193470 A1* | 8/2012 | Kosheleff | 244/102 R |

FOREIGN PATENT DOCUMENTS

| | | |
|---|---|---|
| DE | 29713530 U1 * | 9/1997 |
| EP | 1 564 141 | 8/2005 |
| EP | 1 614 625 | 1/2006 |
| FR | 2 689 851 | 10/1993 |
| GB | 2196922 A * | 5/1988 |

* cited by examiner

AIRCRAFT FLOOR, USE OF SAID FLOOR AND AIRCRAFT SECTION FITTED WITH SAID FLOOR

RELATED APPLICATIONS

The present application is a national stage entry of PCT Application No. PCT/EP2007/053419, filed Apr. 6, 2007, which claims priority from French Application Number 0651386, filed Apr. 20, 2006, the disclosures of which are hereby incorporated by reference herein in their entirety.

FIELD OF THE INVENTION

This invention concerns an aircraft floor adapted to support heavy loads. More precisely, the invention concerns an aircraft floor capable of absorbing the transverse forces to which it may be subjected. Transverse forces are understood to be those forces extending transversely in relation to the axis of the aircraft provided with such a floor. The invention finds applications particularly in the manufacturing of aircraft intended for the transportation of merchandise, where the merchandise is stowed on the floor of the aircraft.

BACKGROUND OF THE INVENTION

In the field of merchandise transportation, the use of specialized aircraft where the internal volume of the fuselage is specifically designed to receive cumbersome merchandise is known. The merchandise is stowed on the floor of the aircraft in so as to be kept in position no matter what the forces are to which the merchandise will be subjected. More precisely, the merchandise, which is generally held in containers, is placed on top of the floor and kept thereon by structural elements extending transversely in relation to the floor's rails. The containers are kept so as to be supported on these structural elements, which block the movements of the container in the transverse direction. When the containers are subjected to a transverse movement, the corresponding forces are transmitted to the floor through the structural elements. The aircraft floor must therefore be capable of absorbing all the transverse forces to which it may be subjected. For that reason, the floor rails, which extend in parallel to the longitudinal axis of the aircraft, are firmly mounted on the primary structure of the aircraft. Transverse, or lateral, force is understood to be a horizontal force, extending perpendicularly to the longitudinal axis of the aircraft.

However, where the aircraft sections are equipped with aircraft landing gear, the primary structure of the aircraft is too far away from the floor rails for said rails to be able to be directly affixed on said primary structure. In order to remediate this problem, the use of vertical connecting rods to connect the rails to the primary structure of the aircraft is known. In aircraft sections equipped with landing gear compartments, the floor is therefore a floor hinged on connecting rods.

Such a hinged floor is not capable of absorbing the transverse forces to which it may be subjected. Affixing the exterior rails, that is to say those adjacent to the lateral wall of the fuselage, to said lateral wall of the aircraft fuselage by means of braces is also known. Thus the braces connect the external rails to the lateral primary structure of the aircraft, allowing the lateral support of the floor.

The drawback of such braces, called anti-crash braces, is that they tend to increase the total mass of the aircraft. In the case of an aircraft of large dimensions, for which the fuselage can reach several dozens of meters in length, the number of anti-crash braces required to laterally support the floor can increase the total mass of the aircraft in a non-negligible manner.

SUMMARY OF THE INVENTION

Therefore, according to embodiments of the invention, an aircraft floor is provided that is capable of absorbing the transverse forces to which said floor may be subjected, which does not present the drawbacks of the prior art. A way has also been sought in embodiments of the invention to create such a floor specifically adapted to the aircraft section provided with landing gear compartments.

Therefore, according to embodiments of the invention, the transverse forces have been channeled through a pathway different from that used by prior art. According to embodiments of the invention, the pathway, through which the transverse forces of the floor pass, requires the involvement of floor panels. The floor panels are floor structures positioned between the longitudinal rails of the floor so as to form a flat surface. The floor, according to embodiments of the invention is provided with central rails rigidly mounted on a fixed structure of the aircraft and with lateral rails mounted on the aircraft structure only through vertical connection rods. The lateral rails are therefore not capable of absorbing transverse forces. The lateral rails are positioned longitudinally on both sides of the central rails and extend parallel to said central rails. Floor panels are positioned between each pair of adjacent rails, that is two lateral rails, or two central rails, or one lateral rail and once central rail. When the floor is subjected to a transverse force, the force is transmitted step by step towards a hard point formed by the rigid central rails, through the floor panels, said central rails being capable of absorbing the transverse forces. The transverse forces are therefore directly absorbed by the central rails that are rigidly mounted on the fixed structure of the aircraft. This fixed structure is formed, for example, by crossbeams mounted transversely in relation to the longitudinal rails of the floor. According to one specific embodiment of the invention, the central rails are rigidly mounted on the transverse crossbeams through traversing fastening devices. For example, the fastening device traverses the crossbeam and central rail intended to be affixed thereto. It is possible to arrange oblong openings on the crossbeams so as to be able to fit the assembly of the central rails on the crossbeams. The oblong openings extend parallel to the central rails. Thus, it is possible to longitudinally adjust the mounting of the rails on the crossbeams, so as to be free of certain mounting constraints.

In one embodiment of the invention, an aircraft floor comprises at least one central rail firmly mounted on a rigid structure of the aircraft; at least two lateral rails, positioned on both sides of the central rail, each lateral rail being connected vertically to the structure of the aircraft through a vertical connecting rod and being transversely free, the rails being parallel to one another; and floor panels, each floor panel being positioned between two adjacent rails, so that the transverse forces to which the lateral rails are subjected pass through the floor panels to the central rail, where they are absorbed.

According to the embodiments of the aircraft floor, it is possible to provide all or part of the following additional characteristics:

the central rail is firmly mounted on at least one crossbeam extending transversely to said rail;

the crossbeam is provided, at the point of the fastening area for the central rail, with at least one oblong fastening opening corresponding with a circular fastening opening arranged on the central rail, so as to longitudinally adjust the fastening of the central rail on the crossbeam; and the crossbeam is provided, at the point of the fastening area for the central rail, with at least one module of six oblong fastening openings, each one corresponding with a circular fastening opening of a crossbeam module with six fastening openings.

Embodiments of the invention also concern the use of an aircraft floor according to the invention for an aircraft section comprising two landing gear compartments. According to embodiments of the invention, it is possible to use such a floor so that the lateral rails extend along the roof of the aircraft landing gear compartments, so that the vertical connecting rods connect said lateral rails to said roof of the landing gear compartments. The central rails extend themselves along the central rigid structure of the aircraft, longitudinally bordered by the two roofs of the landing gear cases.

Embodiments of the invention also concern an aircraft section comprising two landing gear compartments and one floor according to the invention, in which the floor comprises a plurality of central rails and a plurality of lateral rails positioned on both sides of the central rails and extending in parallel with the axis of the aircraft.

According to the embodiments of the aircraft section according to the invention, it is possible to provide all or part of the following additional characteristics:

the lateral rails extend along the roof of the landing gear compartments, the vertical connecting rods connecting said lateral rails to said roof of the landing gear compartments;

the landing gear compartments surrounding a central area, along which the central rail extend; and the aircraft section comprising a plurality of crossbeams extending transversely in a central area, the opposite ends of each crossbeam being affixed to a roof of an opposite landing gear compartment.

The invention will be better understood with the reading of the following description and the examination of the drawings that accompany it. These are presented for the purpose of illustration and in no way limit the invention.

DETAILED DESCRIPTION OF THE DRAWINGS

Figure 1:
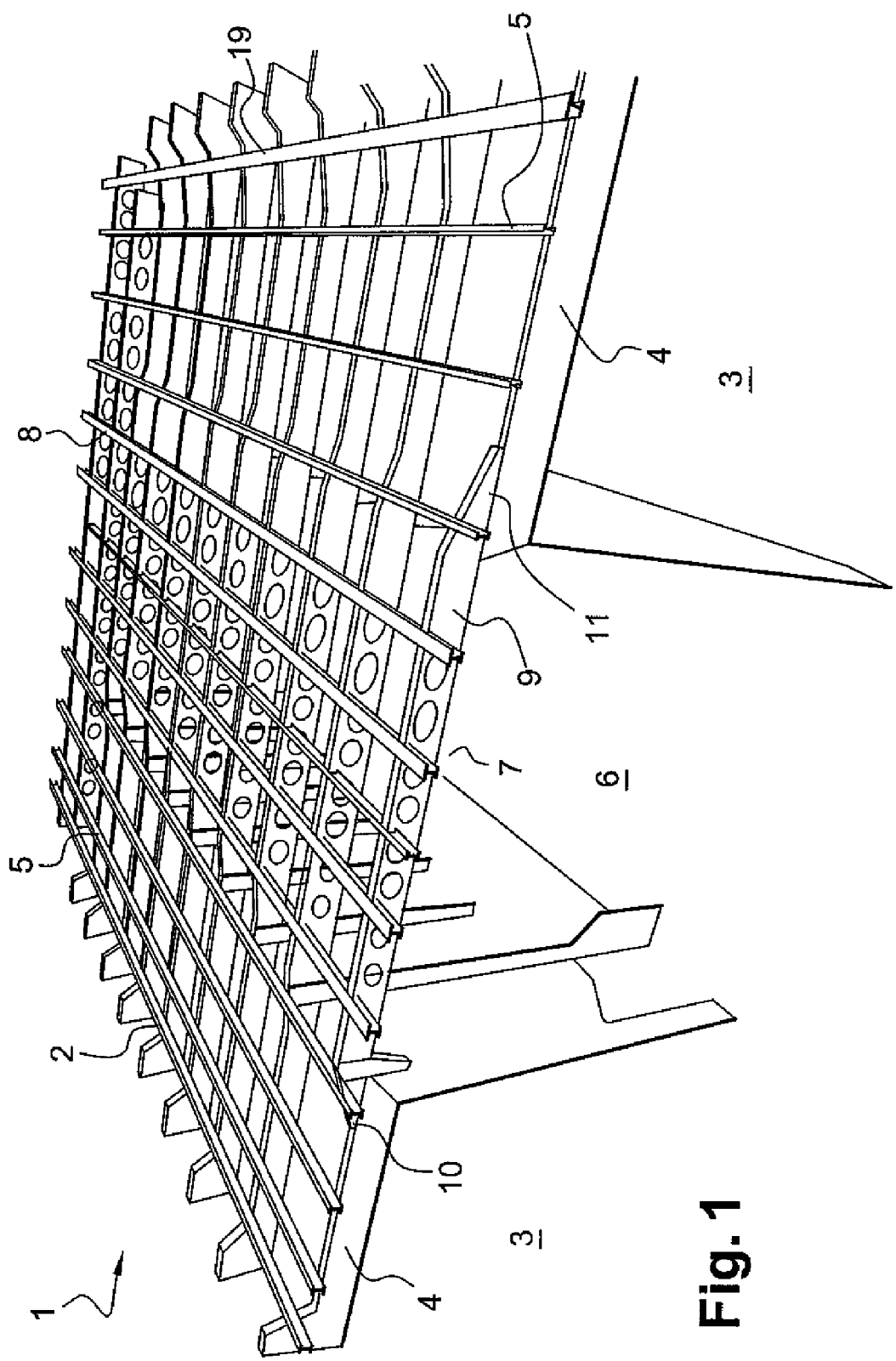
FIG. 1 is a partial schematic representation of an aircraft section at the level of the landing gear compartments, provided with a floor according to an embodiment of the invention.

An aircraft section 1 is represented schematically and partially in FIG. 1 at the level of two landing gear compartments 3. Landing gear compartments 3 are adapted to receive the landing gear of an aircraft in a folded up position, that is to say when the aircraft is in flight. Landing gear compartments 3 are each provided with a landing gear compartment roof 4 along which lateral rails 5 extend. Lateral rails 5 belong to floor 2 of section 1.

The two landing gear compartments 3 are separated from one another by a cargo hold 6. Cargo hold 6 defines a smaller volume, situated under floor 2, which can also serve for the transportation of merchandise. In this case, for example, cargo hold 6 can be filled with containers. A central zone 7, situated above cargo hold 6, comprises central rails 8, which extend parallel to lateral rails 5. In the example represented by FIG. 1, aircraft section 1 is provided with five central rails 8, said central rails 8 being bordered to the right and left respectively by four lateral rails 5.

Figure 3A:
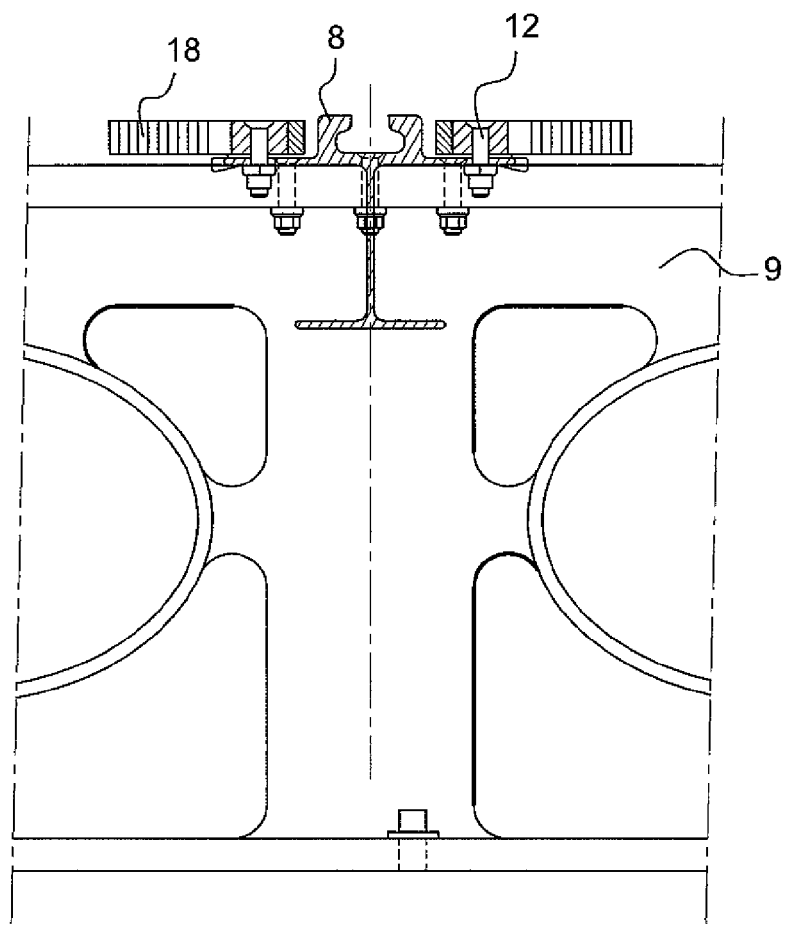
FIGS. 3A and 3B area transverse cross-section and a representation viewed from above a floor according to an embodiment of the invention at the level of a central rail.
Figure 4A:
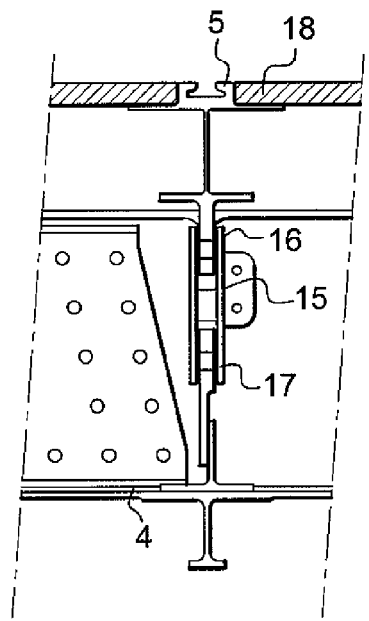
FIGS. 4A and 4B are a transverse cross-section and a longitudinal cross-section of the floor according to an embodiment of the invention at the level of a lateral rail.

In general, floor 2 comprises a plurality of lateral rails 5 and central rails 8, connected directly or indirectly to the primary structure of section 1 of the aircraft, as well as a plurality of floor panels 18 (FIGS. 3A, 4A). Floor panels 18 are interposed between each pair of adjacent rails so as to form a flat surface, on which the merchandise is intended to rest. Each floor panel 18 is then connected by a first longitudinal edge to a portion of a first rail and by a second longitudinal edge, parallel to the first longitudinal edge, to a portion of a second rail, adjacent to the first rail. A longitudinal edge is understood to be a side of floor panel 18 extending parallel to the rails. Between two adjacent rails, multiple floor panels 18 are positioned, one after another, in parallel to the longitudinal axis of the rails. It is also possible to provide fastening means in order to connect each floor panel 18 to the floor panels 18 situated ahead and behind.

As shall be disclosed in more detail below, lateral rails 5 are mounted on said roofs 4 of corresponding landing gear compartments 3, while central rails 8 are mounted on crossbeams 9, which extending transversely in relationship to rails 5 and 8 and in parallel to one another. Each end 10 and 11 of crossbeams 9 is rigidly mounted on roof 4 of a opposite landing gear compartment 3. Crossbeams 9 are affixed in relationship to roof 4 of landing gear compartments 3, and form a central hard point.

Figure 2A:
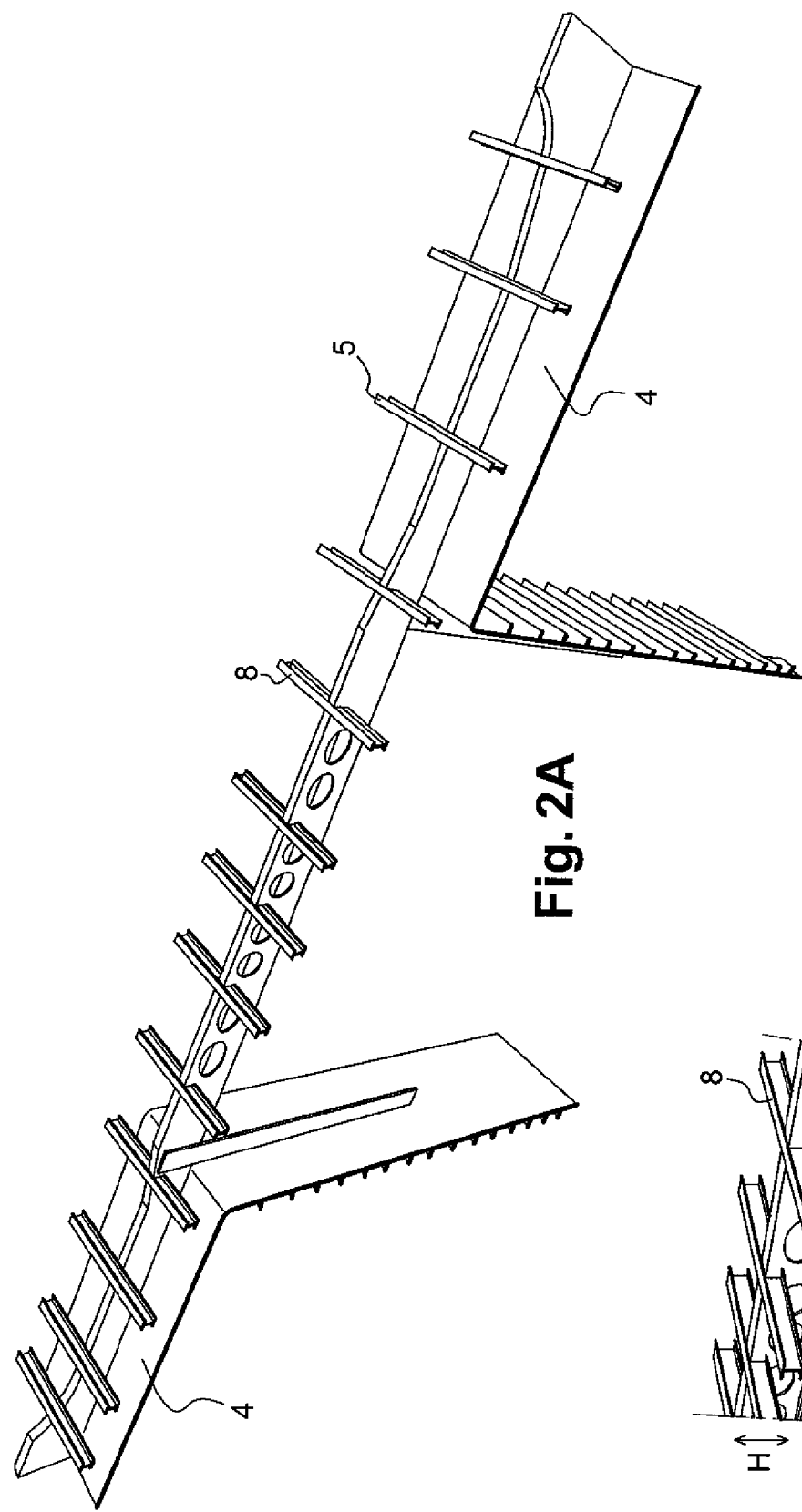
FIGS. 2A and 2B are enlarged schematic representations of certain parts of the floor according to FIG. 1.
Figure 2B:
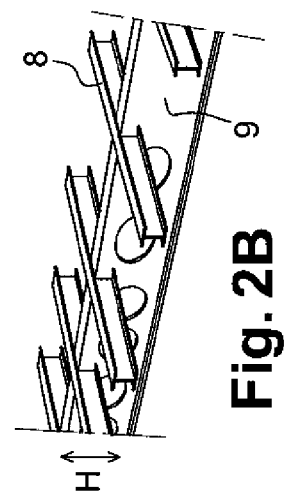

Each central rail 8 is rigidly mounted on multiple successive crossbeams 9. For example, and as represented in FIGS. 2A and 2B, central rails 8 are partially recessed at a height H from crossbeams 9. Height H is understood to be the dimension of crossbeams 9 extending vertically in relationship to roof 4 of landing gear compartments 3. Central rails 8 are kept recessed in crossbeams 9 by fastening devices (not visible in FIGS. 2A and 2B), in such a way that said central rails 8 are kept in position in relationship to the structure of the aircraft. Central rails 8 are kept fixed and immobile on the structure of aircraft section 1 through crossbeams 9, which are themselves affixed and immobile on said structure.

Figure 3B:
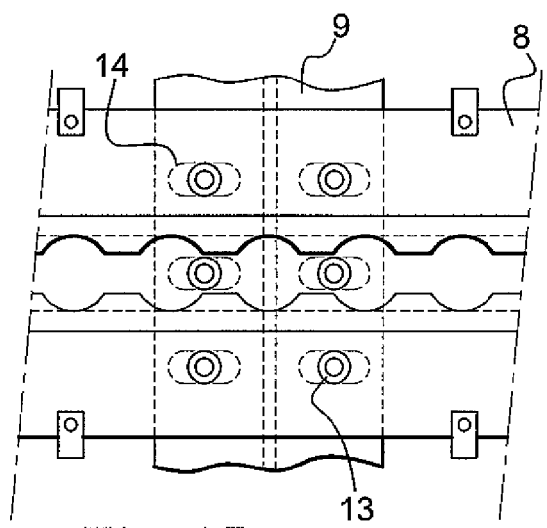

As represented in FIGS. 3A and 3B, a central rail 8 is fastened onto a crossbeam 9 through a fastening device. The fastening device, such as represented by FIGS. 3A and 3B, comprises screws 12 traversing casings arranged respectively on rail 8 and on crossbeam 9. Preferentially, a casing arranged on crossbeam 9 coincides with a casing arranged on central rail 8. Thus, each screw 12 traverses a casing arranged on crossbeam 9 and a casing arranged on central rail 8.

In one specific example, such as represented in FIG. 3B, central rail 8 is fastened onto a crossbeam 9 by six fastening screws 12. Openings 13 are organized in modules, or sets, of six openings on central rail 8. The openings 13 of an individual module extend over two rows of three aligned openings 13, said rows being parallel to each other and perpendicular to the longitudinal axis of central rail 8. Likewise, openings 14 of crossbeam 9 are organized in modules of six. Openings 14 of an individual module extend over two rows of three aligned openings 14, said rows being parallel to each other and perpendicular to the longitudinal axis of central rail 8, that is, parallel to the longitudinal axis of crossbeam 9.

Openings 13 on central rail 8 are circular and cylindrical, while openings 14 on crossbeam 9 are oblong. More precisely, a length of the oval of oblong openings 14 extends parallel to the longitudinal axis of central rail 8. The length of the oval of oblong opening 14 is understood to be the largest diameter of said oblong opening 14. Such an orientation of oblong openings 14 in relationship to central rail 8 allows the longitudinal adjustment of the fastening of rail S to crossbeam 9. Each fastening opening 14 on crossbeam 9 corresponding with a fastening opening 13 on a central rail 8, is preferentially an oblong opening extending parallel to the axis of the corresponding central rail 8. Thus, insofar as each central rail 8 is fastened to a plurality of successive crossbeams 9, a certain amount of play is allowed, through the skew of oblong openings 14, in the connection between central rail 8 and each crossbeam 9, when installing fastening screws 12 into openings 13 and 14, which allows the introduction of all screws 12 into openings 13 and 14 without difficulty. Once all fastening screws 12 have been installed in openings 13 and 14, the connection between central rail 8 and crossbeams 9 is made fixed by tightening screws 12 by means of a nut for example.

One of the drawbacks of the use of oblong openings 14 is the fact that these oblong openings 14 are susceptible to transferring perpendicular forces at the height of said oblong openings 14. Height is understood to be the dimension of oblong opening 14 extending in height H of crossbeam 9. Oblong openings 14 may then be subject to greater strains that the strains that may be withstood by the material forming crossbeam 9. However, contrary to all expectations, tests done to verify the mechanical resistance of the central rail 8 connection to crossbeam 9, when said connection is subjected to transverse forces, show that oblong openings 14 are capable of resisting the strains that such forces generate and working in a satisfactory manner to absorb the transverse forces.

For example, a test was done using a central rail with a thickness of 2.2 mm, for which the circular openings have a diameter or 5 mm, and a crossbeam with a thickness of 4 mm, for which the oblong openings have dimensions of 5.6 mm by 10.6 mm. Thickness is understood to be the dimension extending vertically and perpendicular to the longitudinal axis of the element in question. The distance between two adjacent openings on the crossbeam or the real is 24 mm. The smallest distance between an opening and an edge of the crossbeam or the rail provided with said opening is 12 mm.

Transverse forces were applied to a central rail/crossbeam assembly having the above characteristics. The transverse forces were applied by means of a hydraulic machine and managed by means of an electronic device.

The results of these tests show that the above central rail/crossbeam assembly can resist transverse forces on the order of 28 kN, even though the maximum value of transverse forces to which the floor rails could be subjected in an aircraft section is on the order of 16 kN.

Central rails 8 are therefore firmly mounted on the primary structure of the aircraft section, through crossbeams 9, thus preventing any displacement of central rails 8. Central rails 8 are capable of absorbing the transverse forces, as well as the vertical and longitudinal forces. Vertical force is understood to be perpendicular to the surface of roof 4 of a landing gear compartment. Longitudinal force is understood to be parallel to the longitudinal axis of rails 8.

Figure 4B:
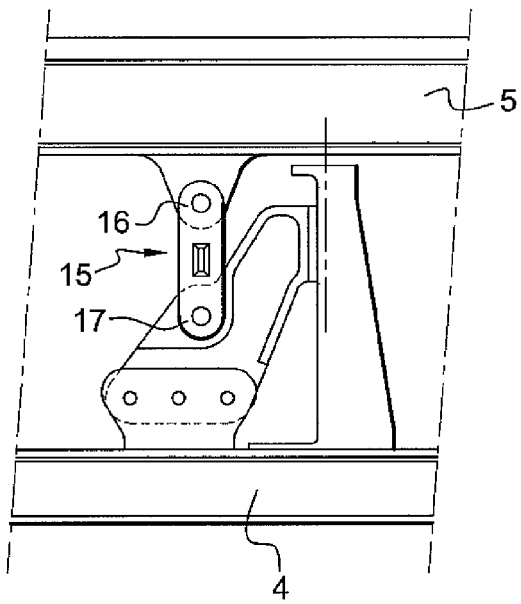

Conversely, and as represented in FIGS. 4A and 4B, lateral rails 5 are not firmly mounted on the primary structure of the aircraft section. In effect, lateral rails are too far from the surface of roof 4 of landing gear compartments 3, to be able to be directly fastened thereto. Furthermore, each lateral rail 5, i.e. the ones extending along the landing gear compartments 3, is connected to roof 4 of said landing gear compartments 3 through a vertical connection rod 15 on which it is hinged. Each vertical connecting rod 15 is provided with an top end 16, mounted on a lateral rail 5, and a bottom end 17, mounted on roof 4 or a landing gear compartment 3, above which said lateral rail 5 extends. Connecting rods 15 are capable of absorbing vertical forces, but not transverse or longitudinal forces.

Moreover, according to embodiments of the invention, when floor 2 is subjected to transverse forces from a lateral rail 5, said forces are transmitted step by step from this first lateral rail 5 to the adjacent lateral rails, through floor panels 18, positioned between each pair of adjacent rails, towards the hard point formed by central rails 8. The transverse forces thus conveyed to central rails 8 are absorbed at the level of said central rails 8, which, as described above, are capable of absorbing such forces.

Figure 5:
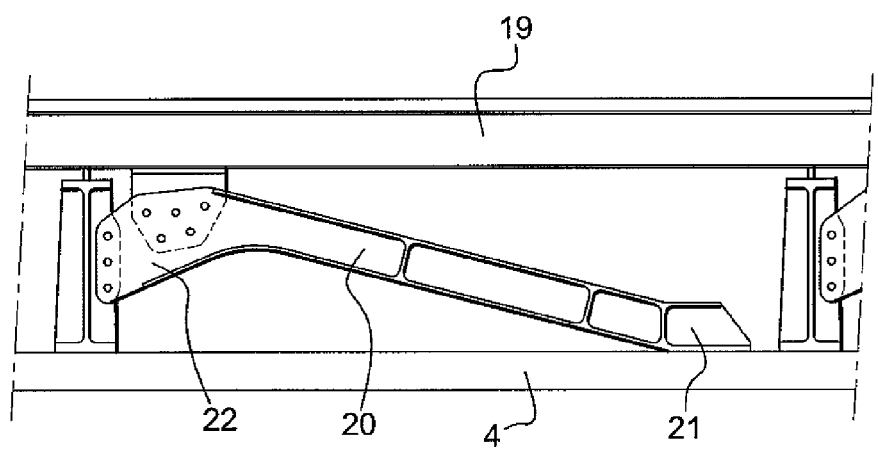
FIG. 5 is a longitudinal cross-section of the floor according to an embodiment of the invention at the level of an outermost lateral rail.

In one specific example, as represented in FIG. 5, it is possible to connect external rail 19 to roof 4 of a landing gear compartment 3 through a specific brace 20, capable of absorbing, in addition to vertical forces, the horizontal forces. Thus, external rail 19 is itself able to suitably resist both frontal impacts, such as those due to a crash, and turbulence and vertical impacts due to the loading of the merchandise.

Therefore, brace 20 has a general boomerang-type form, that is the form of a Z. More precisely, brace 20 extends transversely in a plane parallel with the axis of external rail 19 and vertically in relationship with roof 4 of gear compartment 3. A bottom end 21 of brace 20 is integrated with roof 4 of gear compartment 3, and a top end 22 is integrated with external rail 19. Brace 20 is capable of withstanding horizontal forces, parallel to external rail 19, due to the fact of the geometry of said brace 20. In effect, brace 20 extends from the rear to the front of the aircraft section. Rear and front are understood to be rear and front in relationship to the forward movement of the aircraft comprising section 1 in question. Moreover, brace 20 can be slightly bent in order to withstand vertical impacts.

The invention claimed is:

1. An aircraft section of an aircraft, the aircraft section comprising:
  a first landing gear compartment and a second landing gear compartment, each of the first landing gear compartment and the second landing gear compartment comprising a roof;
  a central compartment flanked by the first and second landing gear compartments;
  an aircraft floor, the aircraft floor including
    a plurality of central rails coupled to a rigid structure of the aircraft and extending along a longitudinal axis of the aircraft,
    a plurality of lateral rails sandwiching the plurality of central rails, the plurality of central and the plurality of lateral rails being parallel to each other and extending along a longitudinal axis of the aircraft, each lateral rail of the plurality of lateral rails extending along the roof of either the first landing gear compartment or the second landing gear compartment,
    a plurality of vertical connecting rods, each vertical connecting rod of the plurality of vertical connecting rods connecting a lateral rail of the plurality of lateral rail to the roof of one of the first landing gear compartment or second landing gear compartment along which the lateral rail extends, and a plurality of floor panels, each floor panel of the plurality of floor panels being positioned between two adjacent lateral rails of the plurality of lateral rails so as to form a flat surface, wherein transverse forces to which the plurality of lateral rails are subjected pass through the plurality of floor panels to the plurality of central rails, the transverse forces being absorbed thereby.

2. The aircraft section according to claim 1, further comprising at least one parallel crossbeam extending transversely in an interior volume of the central compartment, wherein a first end of each crossbeam of the at least one crossbeam is affixed to the roof of the first landing gear compartment, and a second opposite end of each crossbeam of the at least one crossbeam is affixed to the roof of the second landing gear compartment.

3. The aircraft section according to claim 2, wherein the plurality of central rails are coupled to the at least one crossbeam that extends transversely in relationship to the plurality of central rails.

4. The aircraft section according to claim 3, wherein each central rail of the plurality of central rails presents structure defining circular fastening openings, and wherein each crossbeam of the at least one crossbeam presents structure defining oblong fastening openings corresponding to circular fastening openings positioned on a central rail of the plurality of central rails, such that a fastening of the central rail on the corresponding crossbeam is longitudinally adjustable.

5. The aircraft section according to claim 4, wherein a crossbeam of the at least one crossbeam is provided with at least one module of six oblong fastening openings, and wherein a central rail of the plurality of central rails is provided with at least one module of six circular fastening openings, each oblong fastening opening of the at least one module of six oblong fastening openings of the crossbeam corresponding to a circular fastening opening of the at least one module of six circular fastening openings of the central rail.

* * * * *